(12) United States Patent
Hollis (10) Patent No.: US 6,244,294 B1
(45) Date of Patent: Jun. 12, 2001

(54) RADIATOR PRESSURE RELEASE VALVE FOR A TEMPERATURE CONTROL SYSTEM

(76) Inventor: Thomas J. Hollis, 5 Roxbury Dr., Medford, NJ (US) 08055

( * ) Notice: Subject to any disclaimer, the term of this patent is extended or adjusted under 35 U.S.C. 154(b) by 0 days.

(21) Appl. No.: 09/541,527

(22) Filed: Apr. 3, 2000

Related U.S. Application Data (60) Provisional application No. 60/134,577, filed on May 17, 1999.

(51) Int. Cl.⁷ ............................. F16K 17/06; F01P 7/14
(52) U.S. Cl. ......................... 137/529; 137/522; 251/83; 123/41.27
(58) Field of Search .......................... 123/41.27, 41.54; 137/522, 523, 539, 539.5, 529; 251/82, 83

(56) References Cited

U.S. PATENT DOCUMENTS

| | | | |
|---|---|---|---|
| 2,191,611 | * | 2/1940 | Eshbaugh et al. .................... 137/539 |
| 3,664,368 | * | 5/1972 | Sweeney ............................. 137/539.5 |
| 3,918,418 | * | 11/1975 | Horn ...................................... 137/469 |
| 5,306,430 | * | 4/1994 | Dixon et al. .......................... 137/895 |
| 5,487,407 | * | 1/1996 | Eaker ..................................... 137/522 |

* cited by examiner

*Primary Examiner*—John Rivell
*Assistant Examiner*—Ramesh Krishnamurthy
(74) *Attorney, Agent, or Firm*—Drinker Biddle & Reath LLP (57) ABSTRACT

A radiator pressure relief valve is disclosed for transferring fluid from a radiator to an overflow bottle to relieve pressure in the radiator. The valve includes a housing with an internal chamber and an inlet and outlet communicating with the chamber. A valve member is located within the housing adjacent to the inlet. The valve member is movable with respect to the inlet and adapted to prevent fluid flow from the inlet into the chamber when the valve member is positioned against the inlet. A support pin is located within the housing and movable with respect to the valve member. The support pin has a first position where the support pin is in contact with the valve member and inhibits movement of the valve member and a second position where the support pin is spaced apart from the valve member. A spring is mounted within the housing and biases the valve member away from the support pin.

8 Claims, 9 Drawing Sheets

RADIATOR PRESSURE RELEASE VALVE FOR A TEMPERATURE CONTROL SYSTEM

RELATED APPLICATION

This application is related to and claims priority from U.S. Provisional Application Ser. No. 60/134,577, filed May 17, 1999.

FIELD OF THE INVENTION

This invention relates to a valve for controlling the pressure within a radiator in an internal combustion gasoline or diesel engine and, more particularly, to a pressure relief valve mounted to the radiator which controls the dissipation of pressure within the radiator.

BACKGROUND OF THE INVENTION

U.S. Pat. Nos. 5,458,096, 5,505,164, 5,467,745, 5,669,335, and 5,657,722 all relate to a system for controlling the flow of coolant or temperature control fluid in an engine for improving the temperature state of the engine. A system incorporating the teachings disclosed in those patents is currently being developed by Windfall Products, Inc. and is referred to as the EETC™ system.

The above-referenced patents, in particular, discuss the disadvantages associated with conventional thermostat regulated cooling systems. A conventional thermostat operates as a one-way valve, blocking or allowing flow of coolant to a radiator. Most prior art coolant systems employ wax pellet type or bimetallic coil type thermostats. These thermostats are self-contained devices which open and close according to precalibrated temperature values. The thermostat is mounted such that the wax pellet is located within the coolant. Thus, the state of the prior art wax pellet type or bimetallic coil type thermostats is controlled solely by coolant temperature. Other factors, such as ambient air temperature or oil temperature, cannot be taken into account when setting the state of such thermostats.

Coolant systems must perform a variety of functions in addition to cooling the engine parts. In cold weather, the cooling system must deliver hot coolant to heat exchangers associated with the heating and defrosting system so that the heater and defroster can deliver warm air to the passenger compartment and windows. The coolant system must also deliver hot coolant to the intake manifold to heat incoming air destined for combustion, especially in cold ambient air temperature environments, or when a cold engine is started. Ideally, the coolant system should also reduce its volume and speed of flow when the engine parts are cold so as to allow the engine to reach an optimum hot operating temperature. Since one or both of the intake manifold and heater need hot coolant in cold ambient air temperatures and/or during engine start-up, it is not practical to completely shut off the coolant flow through the engine block.

Practical design constraints limit the ability of the coolant system to adapt to a wide range of operating environments. For example, the heat removing capacity is limited by the size of the radiator and the volume and speed of coolant flow.

The EETC system was developed in order to rectify the deficiencies of the prior art cooling systems. The EETC system includes, in one configuration of the system, a hydraulically controlled valve which regulates flow of temperature control fluid between a water jacket surrounding the engine and a radiator. The valve has a valve member which is reciprocated between an open and closed position for controlling flow to or from the radiator. The valve is disclosed in detail in U.S. Pat. No. 5,458,096 which is incorporated herein by reference in its entirety. The system also includes a hydraulic fluid injection system which supplies pressurized fluid to the valve for controlling its opening and closing. A processor is utilized for controlling the hydraulic fluid injection system (and, thus, the state of the valve) based upon various sensed signals and one or more temperature control curves. The details of the EETC system, including the hydraulic fluid injection system, are disclosed in U.S. Pat. Nos. 5,467,745, 5,507,251, 5,638,775, 5,657,722, and 5,669,335, which are all incorporated herein by reference in their entirety.

Figure 1A:
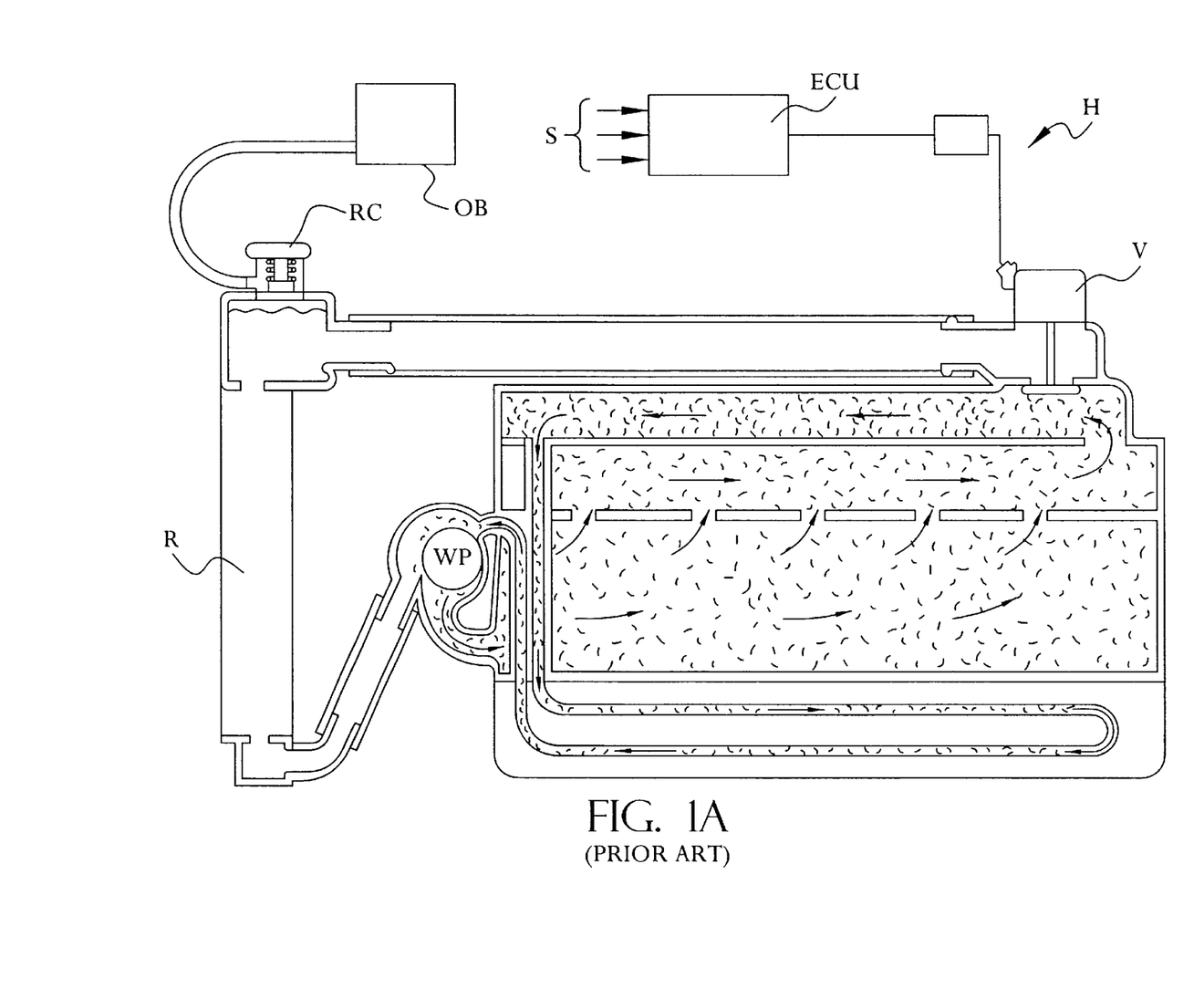
FIGS. 1A–1C are schematic representations of a prior art electronic engine temperature control system.
Figure 1B:
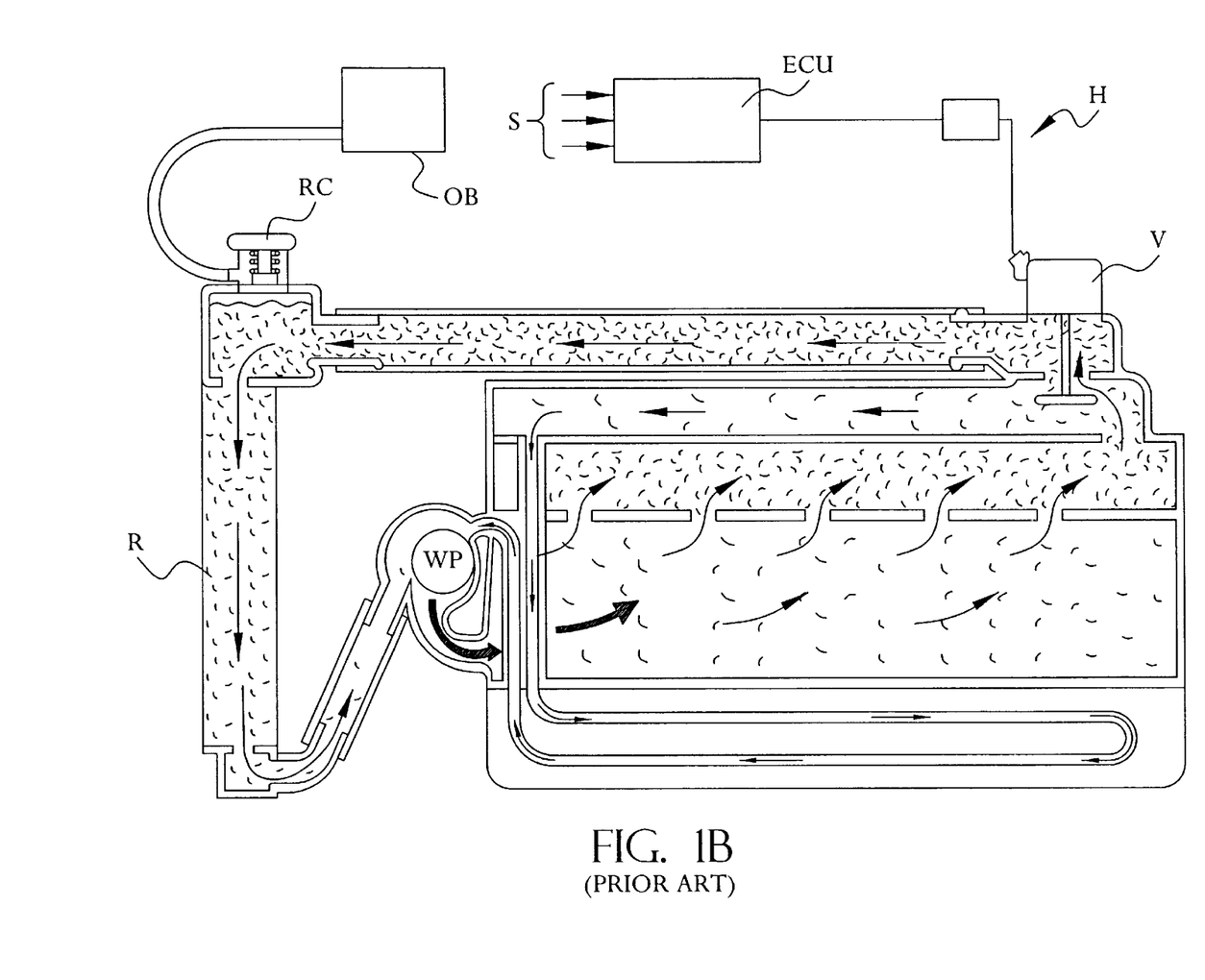
Figure 1C:
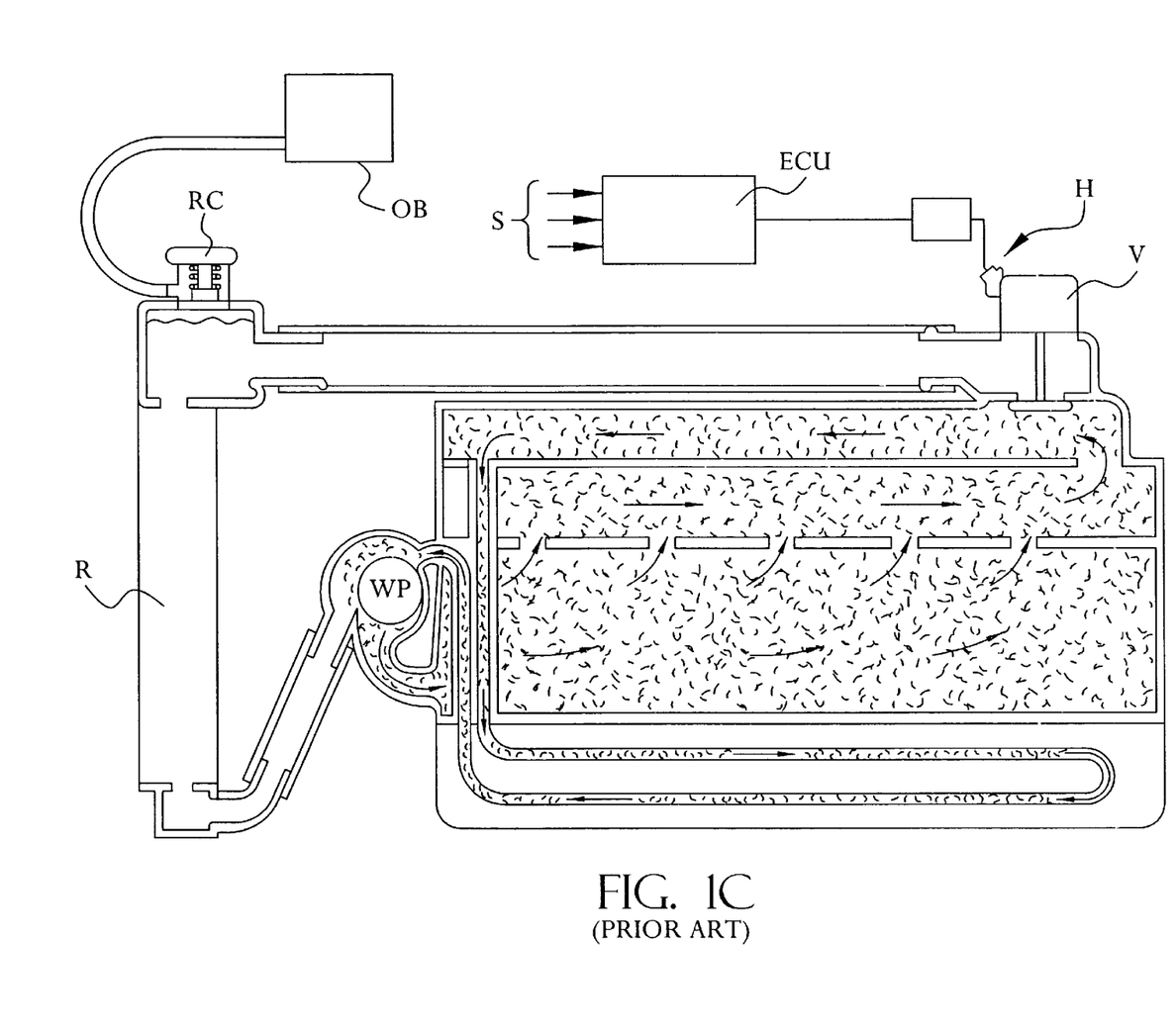

FIGS. 1A–1C schematically illustrate the operation of the EETC system with a hydraulic EETC valve. FIG. 1A illustrates the flow of temperature control fluid through the water jacket of an engine. The flow of the temperature control fluid is depicted by the arrows. The stippling is used in the figure to represent the temperature state of the temperature control fluid (i.e., more stippling represents a higher temperature). As shown, the EETC valve V is in its closed position preventing flow of temperature control fluid to the radiator R. Instead, the temperature control fluid circulates only within the water jacket. The processor, such as an engine control unit (ECU), monitors a variety of signals, such as, for example, temperature control fluid temperature, ambient air temperature and/or engine oil temperature (generally designated by arrows S). Based on these signals, the ECU determines the temperature state of the engine. When the temperature state of the engine exceeds a threshold valve, the ECU sends a signal to a hydraulic fluid actuation system H to open the EETC valve V. The hydraulic fluid actuation system includes a pump which supplies hydraulic fluid to a solenoid communicating with the valve. FIG. 1B depicts the EETC system after the valve V has opened with the temperature control fluid flowing to and from the radiator.

Figure 2:
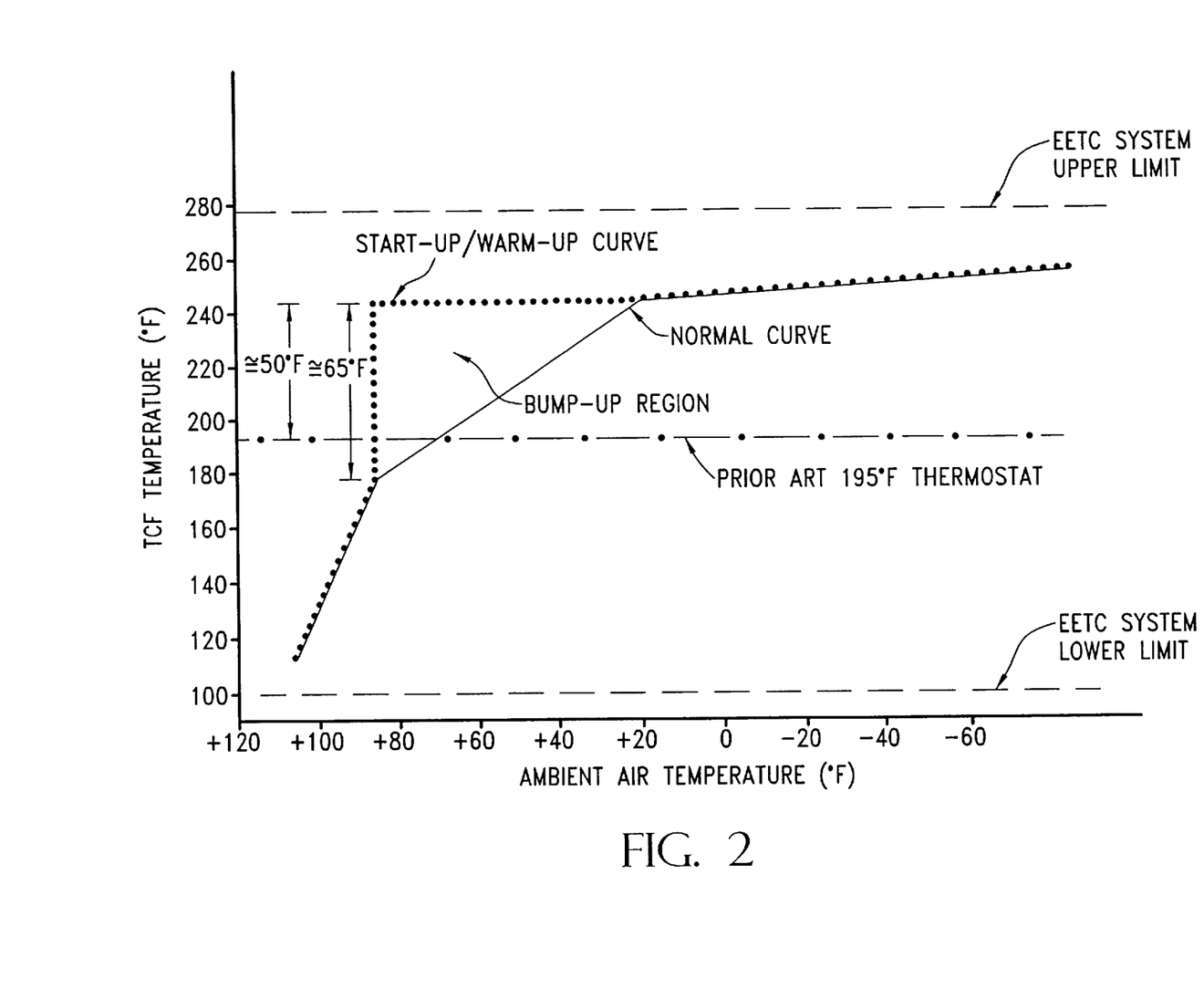
FIG. 2 is a graphical illustration of an exemplary temperature control curve for use in controlling actuation of an electronic engine temperature control valve.

FIG. 2 illustrates one embodiment of a temperature control curve for controlling the EETC valve V. The temperature control curve (identified as the "normal" curve) is shown compared with the plot of a conventional prior art thermostat. As shown, the temperature control fluid (TCF) temperature at which the valve is opened and closed varies as a function of the ambient temperature. For ambient temperatures less than 85° F., the temperature control fluid temperature in the engine will run hotter than a system that uses a conventional thermostat.

As its temperature increases, the temperature control fluid will expand. The fluid expansion generates increased pressures within the engine cooling system and, in particular, within the radiator. The increased pressure within the system increases the boiling point of the temperature control fluid. This is beneficial since it allows the engine (and temperature control fluid) to operate at a higher temperature. However, if the pressure increases too much, it could cause rupture of the thin walled radiator cores found in most conventional radiators.

In order to prevent over pressurization of a cooling system, conventional engines incorporate a radiator cap RC which allows fluid to blow out of the radiator R into an overflow bottle OB when the pressure within the radiator R exceeds a pre-set value. The radiator cap RC also allows fluid to be drawn back into the radiator R when the engine cools.

Conventional radiator caps RC are designed to vent pressure from the radiator when the radiator pressure exceeds 15 psi. Testing has shown that the temperature of the temperature control fluid in the EETC system during cold ambient temperatures (e.g., less than 5° C.), produces pressures within the radiator that approach and slightly exceed 15 psi. If this pressure is not relieved, damage to the radiator could result.

A need, therefore, exists for a system that dissipates pressure within the radiator during cold weather conditions in order to reduce pressurize within the radiator.

SUMMARY OF THE INVENTION

The present invention relates to a radiator pressure relief valve for transferring fluid from a radiator to an overflow bottle in order to relieve pressure in the radiator. The radiator preferably includes a radiator cap that is designed to vent temperature control fluid when the pressure within the radiator exceeds a first threshold value.

The valve includes a housing that defines an internal chamber. The housing has an inlet and an outlet both communicating with the chamber. A valve member is located within the housing adjacent to the inlet. The valve member is movable with respect to the inlet and adapted to prevent fluid flow from entering the chamber from the inlet when the valve member is positioned against the inlet.

A support pin is located within the housing and movable with respect to the valve member. The support pin has a first position where it is in contact with the valve member and a second position where it is spaced apart from the valve member.

A spring is mounted within the housing and biases the valve member away from the support pin. In one embodiment, a primary spring is mounted within the housing and biases the support pin into its first position in contact with the valve member.

A processor controls the location of the support pin. In one embodiment, the processor controls the biasing of the first spring by controlling supply of vacuum pressure which compresses or retracts the first spring. In another embodiment, the processor controls a solenoid which extends and retracts the support pin.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 5A–5B are cross-sectional views of another embodiment of a radiator pressure relief valve according to the present invention.

DESCRIPTION OF THE PREFERRED EMBODIMENT

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Certain terminology is used herein for convenience only and is not be taken as a limitation on the invention. Particularly, words such as "upper," "lower," "left," "right," "horizontal," "vertical," "upward," and "downward" merely describe the configuration shown in the figures. Indeed, the valves and related components may be oriented in any direction.

Figure 3A:
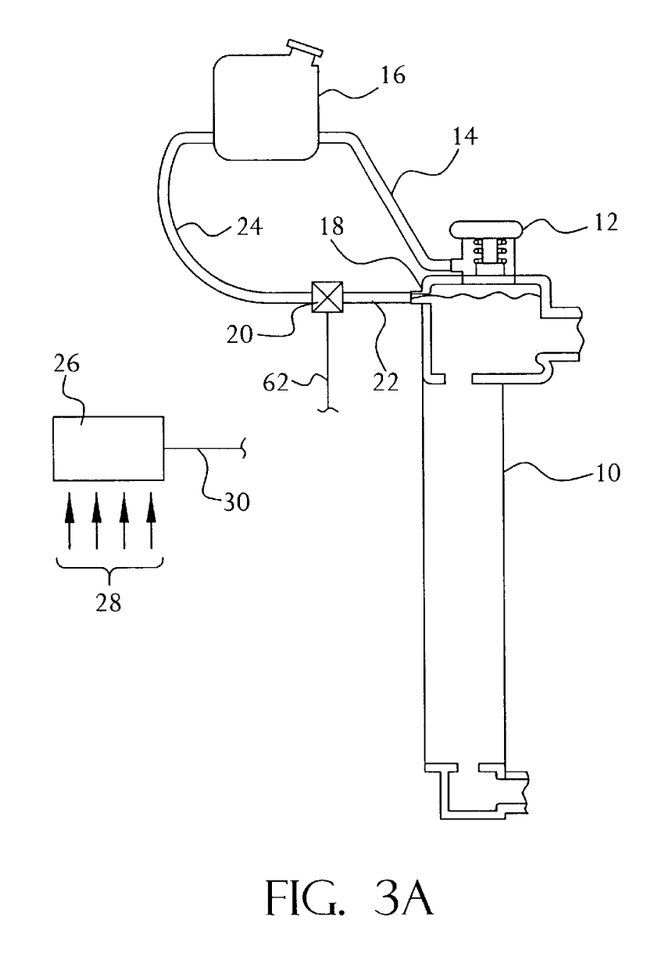
FIGS. 3A–3B are a schematic representation of a radiator incorporating a radiator pressure relief valve according to the present invention.
Figure 3B:
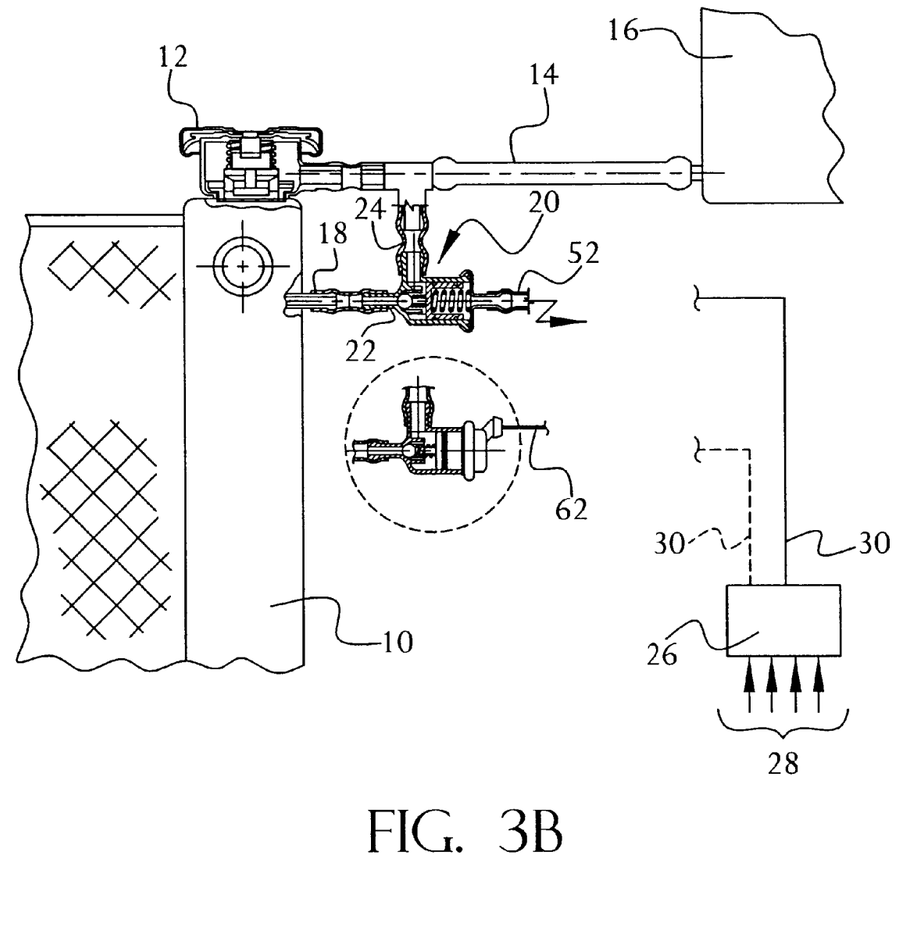

Referring now to the drawings wherein like reference characters identify corresponding or similar elements throughout the several views, FIG. 3 is a schematic illustration of a radiator 10 in an internal combustion engine (not shown). The radiator 10 may include a conventional radiator cap 12 with a overflow line 14 leading to an overflow bottle 16. The radiator 12 is conventional except as noted herein. The radiator 12 contains temperature control fluid (commonly referred to as coolant). A port 18 is preferably formed on the radiator 10 or the radiator cap 12. A pressure relief valve 20 is connected to the port 18, such that the valve 20 is in fluid communication with the port 18. The fluid connection can be through a first fluid line 22. The pressure relief valve 20 is connected to the overflow bottle 16 through a second fluid line 24.

A signal processor 26, such as an engine control unit (ECU), receives a plurality of signals from a variety of sources, such as, for example, temperature control fluid temperature, ambient air temperature, radiator pressure, radiator temperature, and/or engine oil temperature (generally designated by arrows 28). Based on one or more of these signals 28, the processor 26 determines whether the pressure within the radiator 10 should be vented or dissipated. This determination can be made by comparing the actual radiator pressure, if such a signal is provided, against a predetermined value.

Alternatively and more preferably, the processor 26 monitors the ambient air temperature and the temperature control fluid temperature. When the ambient air temperature is less than 5° C. and the temperature control fluid temperature is less than 100° C., the processor 26 sends an output signal 30 which is used to change the opening point of the pressure relief valve 20 as discussed hereinafter.

Figure 4A:
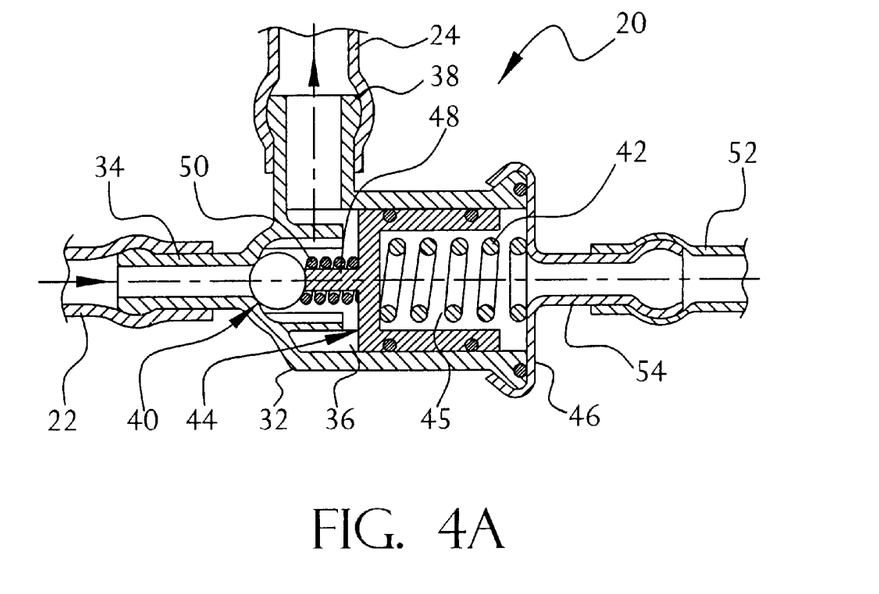
FIGS. 4A–4B are cross-sectional views of one embodiment of a radiator pressure relief valve according to the present invention.
Figure 4B:
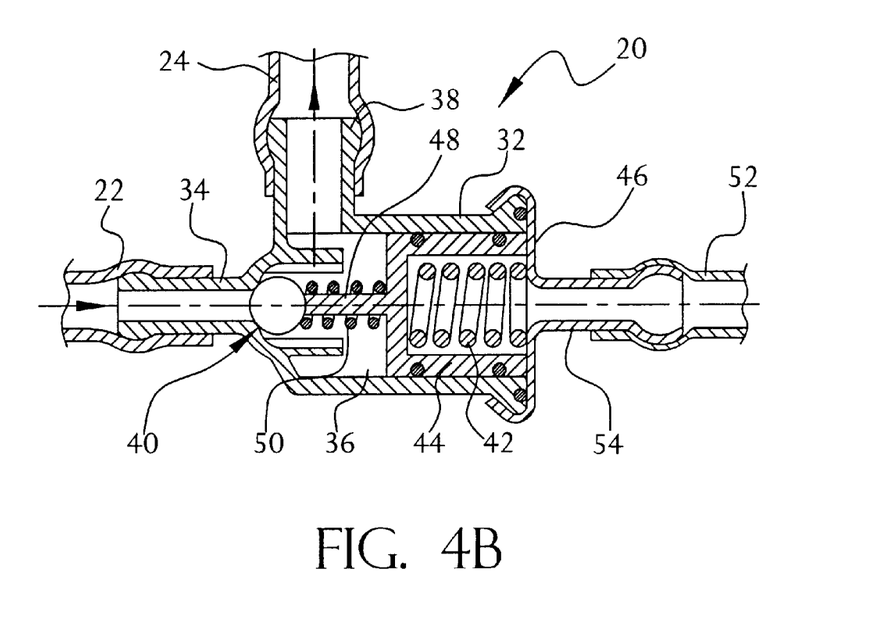

In one embodiment of the invention shown in FIGS. 4A and 4B, the output signal 30 controls the supply of vacuum pressure, such as from the intake manifold. The vacuum pressure is used to change the opening point of the valve 20. More particularly, the pressure relief valve 20 is a two-stage mechanical pressure valve. The valve 20 includes a housing 32 with an inlet 34 that communicates with an inner chamber 36. The inlet 34 is connected to the first fluid line 22. An outlet 38 is formed on the housing 32 which communicates with the chamber 36. The outlet 38 is connected to the second fluid line 24. The housing can be made from any suitable material, such as plastic.

The valve 20 includes a valve member 40 which prevents flow into the chamber 36 through the inlet 24. The valve member 40 is, in one embodiment, a ball which is biased toward and seats against the inlet 34 to obstruct the fluid flow from the inlet 34. The valve member (e.g., ball) can be made from any suitable material capable of functioning in a radiator, such as plastic or TEFLON material. (TEFLON is a registered trademark of E.I. du Pont De Nemours and Company, Wilmington, Del., for polytetrafluoroethylene material.) The biasing is provided by one of two springs depending on the operational stage of the valve 20. In a first stage, a primary spring 42 biases the valve member 40 toward the inlet 34. The primary spring 42 is located within the housing, preferably between a cylindrical piston 44 slidably mounted within the housing 32 and a cap 46 attached to an end of the housing 32. The primary spring 42 urges the piston 44 away from the cap 46 and toward the ball 40. While a piston 44 is shown in the figures, other components can be used in the present invention. For example, a flexible diaphragm or similar displaceable pressure receiving surface can be attached to the housing 32 which separates the primary spring 42 from the valve member 40. The piston 44 has a support pin 48 on it that extends outward from the piston 44 and is designed to contact the ball 40. The piston 44 and support pin 48 are movable in combination with respect to the ball 40. The piston 44 forms a vacuum pressure chamber 45 in the housing 32.

A secondary spring 50 is located between the piston 44 and the ball 40 and urges the ball 40 away from the piston 44. The secondary spring 50 biases the ball 40 when the valve 20 is in its second stage discussed below. The secondary spring 50 is preferably disposed about the support pin 48 so as to be laterally constrained by it.

When the piston 44 is in the position shown in FIG. 4A (i.e., the first stage), the ball 40 directly contacts the support pin 48. Accordingly, in order to displace the ball from the inlet 34, a sufficient force must be applied to compress the primary spring 42. When the piston 44 is in the position shown in FIG. 4B (i.e., the second stage), the support pin 48 does not contact the ball. Instead, only the secondary spring 50 holds the ball 40 against the inlet 34. In this position, only a force sufficient to overcome the biasing of the secondary spring 50 is needed to unseat the ball 40 from the inlet 34.

As discussed above, the processor 26 controls or varies the point at which the pressure relief valve 20 opens. More particularly, the processor 26 controls which spring biases the ball against the inlet 34. In the embodiment of the valve shown in FIGS. 4A and 4B, the processor 26 controls a supply of negative or vacuum pressure to the housing 32. The vacuum pressure is fed along a vacuum line 52 to a vacuum port 54 in the cap 46. The vacuum port 54 communicates with the primary spring side of the piston 44. FIG. 4A illustrates the piston's 44 position when no vacuum pressure is supplied. As such, the primary spring 42 biases the piston 44 toward the ball 40. When vacuum pressure is supplied to the vacuum port 54, the vacuum pressure draws the piston 44 away from the ball 40. FIG. 4B illustrates this position of the piston 44. It should be readily apparent that the applied vacuum pressure must be sufficient to overcome the spring force of the primary spring 42. When the piston 44 is drawn away from the ball 40, the support pin 48 no longer contacts the ball 40. As such, only the secondary spring 50 maintains the ball 40 in its sealing relationship with the inlet 34. The secondary spring 50 preferably has a lower spring force than the primary spring 42, thus allowing the ball 40 to be forced away from the inlet 34 at a lower pressure. Hence, by controlling the supply of vacuum pressure to housing, the processor 26 can control the opening point of the valve 20.

The primary spring would be selected to provide the desired maximum pressure relief. The following table lists the empirically determined preferred primary spring force needed for a variety maximum radiator pressures. These spring forces are based on an inlet 34 with a 0.180" inner diameter and a 0.20" diameter ball seat seal.

| Maximum Pressure | Spring Load |
|---|---|
| 15 psi | 0.473 lbs. |
| 20 psi | 0.63 lbs. |
| 25 psi | 0.79 lbs. |
| 30 psi | 0.95 lbs. |

As stated above, the secondary spring 50 has a spring force that is lower than the primary spring force. In one preferred embodiment, the secondary spring force is about 0.3 lbs/in. This low spring force is calculated to provide pressure relief when the pressure within the radiator 10 exceeds about two psi. Of course, springs with alternate spring forces can be used depending on threshold level at which pressure relief in the second stage is desired.

In the embodiment of the valve 20 shown in FIGS. 4A and 4B, the processor 26 controls when vacuum pressure is supplied to the valve 20 to change the valve's opening point. It is contemplated that the processor 26 will supply the vacuum pressure during the warm-up stage when the ambient air temperature is less than 5° C. and the temperature control fluid temperature is less than 100° C. By changing the opening point, the valve 20 would begin to vent temperature control fluid out of the radiator 10 at the point that the pressure reaches the lower threshold (e.g., 2 psi). After a small amount of temperature control fluid vents out and the radiator pressure falls below 2 psi again, the secondary spring 50 will urge the ball 40 back against its seat, sealing off the inlet. The primary spring 42 will remain retracted until the processor 26 determines that the temperature of the temperature control fluid has exceeded 100° C. At this point, the processor 26 removes the vacuum pressure that is being supplied to the valve, allowing the primary spring 42 to bias the piston 44 back toward the ball 40. Since the radiator 10 now contains a smaller amount of fluid, the pressure build-up in the radiator will be slower, allowing the temperature control fluid to reach a higher temperature.

Figure 5B:
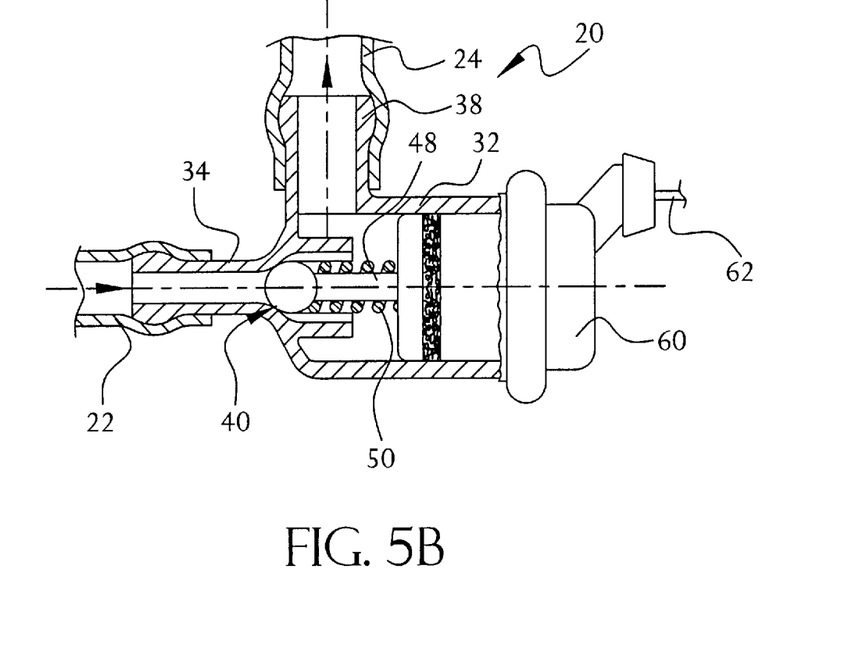

Referring now to FIGS. 5A and 5B, an alternate embodiment of the present invention is shown. In this embodiment, vacuum pressure is not used to change the opening point of the valve. Instead, the processor 26 controls a solenoid 60. The solenoid 60 is attached to the housing 32 and engages with the support pin 48. The solenoid 60 is connected to an actuation source along line 62. The solenoid 60 translates the support pin 48 toward and away from the ball 40 when commanded by the processor 26. FIG. 5A shows the support pin 48 located against the ball 40, and FIG. 5B shows the support pin 48 separated from the ball 40.

As with the first embodiment, the processor 26 controls the change in the opening point of the valve 20. In the embodiment shown in FIGS. 5A and 5B, the processor 26 sends a signal to energize the solenoid 60 at the appropriate time (e.g., during warm-up), commanding the solenoid 60 to retract the support pin 48. Alternately, the solenoid 60 can simply remove any biasing that is applied to the support pin 48, essentially allowing it to freely translate. When the solenoid 60 is energized and the support pin 48 is retracted or unloaded, the secondary spring 50 is the only item biasing the ball 40 into sealing engagement over the inlet 34. There are many suitable solenoids available on the market. Those skilled in the art would be readily capable of selecting a suitable solenoid for use in the present invention. In one preferred embodiment, the solenoid can retract the support pin approximately 1.5 mm to 2 mm.

The use of a solenoid 60 in this embodiment of the invention permits increased control over the opening point of the valve 20. For instance, the opening point can also be varied based on other ambient and engine load conditions, such as allowing radiator pressure to vary over a range of ambient temperatures.

Figure 6:
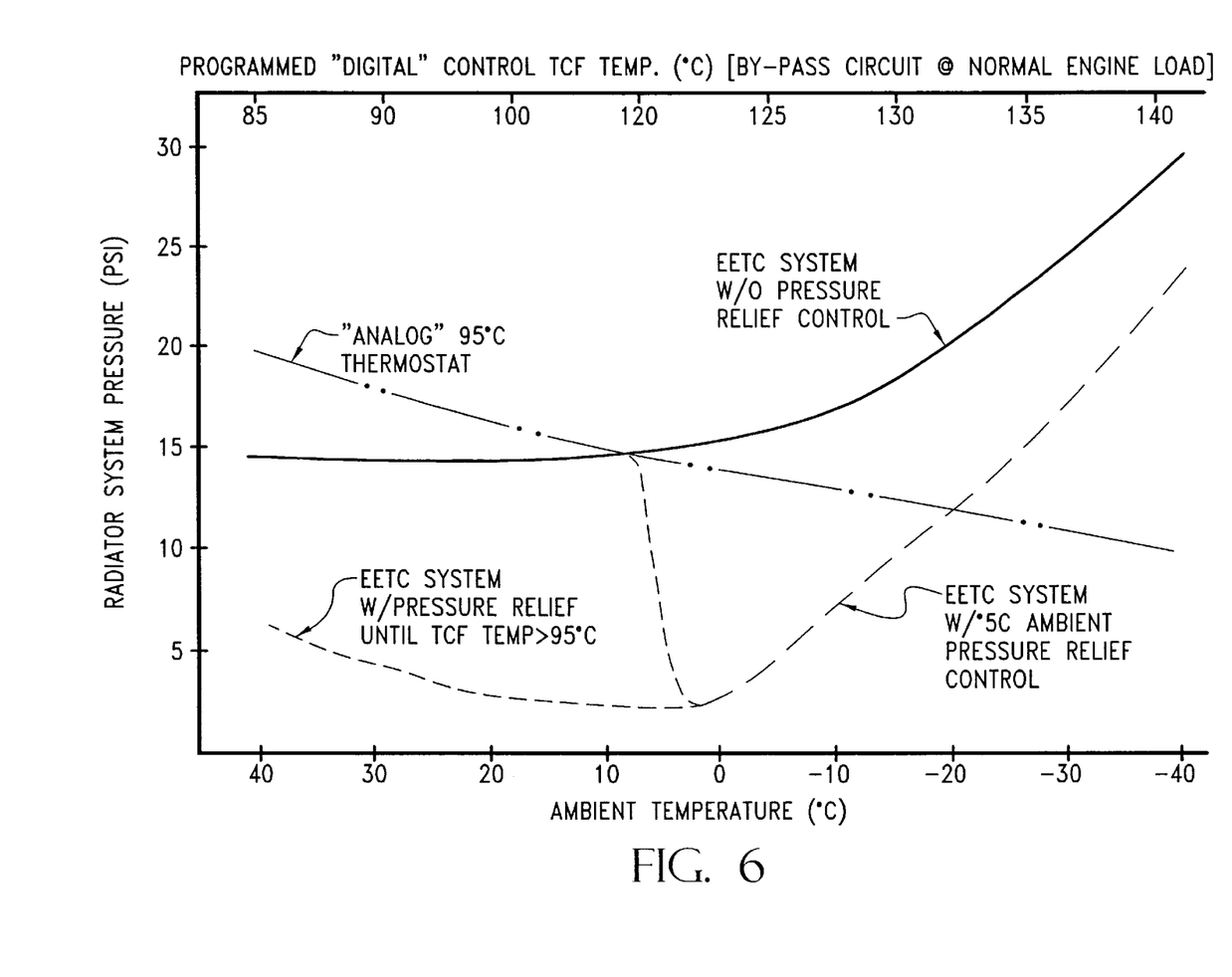
FIG. 6 is a graphical representation of pressure within a radiator in a conventional system compared with a system according to the present invention.

FIG. 6 is a graphical plot illustrating the difference in pressures within a radiator between a conventional system and a system which includes a pressure relief valve according to the present invention.

It should be noted that the present invention can also be utilized on a conventional radiator system. In this alternate embodiment, a vacuum can be applied to the valve when the coolant temperature in the bypass is less than 90° C. As soon as the temperature in the bypass exceeds 90° C., the valve is closed, regardless of the ambient temperature.

The present invention provides a novel way of reducing pressure within a radiator to prevent over pressurization, thereby permitting the temperature control fluid to heat up to a more efficient temperature. The present invention also provides benefits for both conventional thermostatic systems and digitally controlled temperature control systems by reducing wear and tear on heating system components by operating the system at reduced pressures.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A radiator pressure relief valve for transferring fluid from a radiator to an overflow bottle to relieve pressure in the radiator, the valve comprising:

a housing having an internal chamber, the housing having an inlet and an outlet communicating with the chamber;

a valve member located within the housing adjacent to the inlet, the valve member being movable with respect to the inlet and adapted to prevent fluid flow from the inlet to the chamber when the valve member is positioned against the inlet;

a support pin located within the housing and movable with respect to the valve member, the support pin having a first position where the support pin is in contact with the valve member and inhibits movement of the valve member and a second position where the support pin is spaced apart from the valve member; and a secondary spring mounted within the housing for biasing the valve member away from the support pin.

2. A radiator pressure relief valve according to claim 1 further comprising a primary spring mounted within the housing, the primary spring biasing the support pin into its first position in contact with the valve member.

3. A radiator pressure relief valve according to claim 2 wherein the secondary spring has a spring force less than a spring force of the first spring.

4. A radiator pressure relief valve according to claim 2 further comprising:

a pressure receiving surface located within the housing which forms a vacuum pressure chamber, the pressure receiving surface being displaceable with respect to the valve member;

the support pin being attached to the pressure receiving surface;

the primary spring being located within the vacuum pressure chamber and biasing the pressure receiving surface toward the valve member; and a vacuum port on the housing which communicates with the vacuum pressure chamber, the vacuum port adapted to receive a vacuum pressure for displacing the pressure receiving surface and for drawing the support pin away from the valve member.

5. A radiator pressure relief valve according to claim 1 further comprising a solenoid mounted on the housing and engaged with the support pin, the solenoid adapted to translate the support pin from the first position to the second position when the solenoid is energized.

6. A radiator pressure relief valve according to claim 1 wherein the valve member is a ball.

7. A radiator pressure relief valve for transferring fluid from a radiator to an overflow bottle to relieve pressure in the radiator, the valve comprising:

a housing defining an internal chamber;

an inlet on the housing communicating with the chamber;

an outlet on the housing communicating with the chamber;

a ball located within the housing adjacent to the inlet, the ball being movable with respect to the inlet and adapted to prevent fluid flow from the inlet to the chamber when the ball is positioned against the inlet;

a support pin located within the housing and movable with respect to the ball, the support pin having a first position where it is in contact with the ball and a second position where it is spaced apart from the ball;

a piston slidably mounted within the housing and attached to one end of the support pin;

a first spring located between the housing and the piston and adapted to bias the piston and the support pin into the first position in contact with the ball; and a second spring mounted between the ball and the piston and adapted to bias the ball away from the support pin.

8. A radiator pressure relief valve for transferring fluid from a radiator to an overflow bottle to relieve pressure in the radiator, the valve comprising:

a housing defining an internal chamber;

an inlet on the housing communicating with the chamber;

an outlet on the housing communicating with the chamber;

a valve member located within the housing adjacent to the inlet, the valve member being movable with respect to the inlet and adapted to prevent fluid flow from the inlet to the chamber when the valve member is positioned against the inlet;

a support pin located within the housing and movable with respect to the valve member, the support pin having a first position where it is in contact with the valve member and a second position where it is spaced apart from the valve member;

a first spring mounted within the housing for biasing the support pin into its first position in contact with the valve member; and a second spring mounted within the housing for biasing the valve member away from the support pin.

* * * * *